US010024406B2

(12) United States Patent
Stensgaard

(10) Patent No.: US 10,024,406 B2
(45) Date of Patent: Jul. 17, 2018

(54) ACTUATOR

(71) Applicant: Per Stensgaard Innovasjon AS, Oslo (NO)

(72) Inventor: Per Stensgaard, Asgaardstrand (NO)

(73) Assignee: Per Stensgaard Innovasjon AS, Oslo (NO)

( * ) Notice: Subject to any disclaimer, the term of this patent is extended or adjusted under 35 U.S.C. 154(b) by 31 days.

(21) Appl. No.: 14/770,738

(22) PCT Filed: Feb. 28, 2014

(86) PCT No.: PCT/EP2014/053995
§ 371 (c)(1),
(2) Date: Aug. 26, 2015

(87) PCT Pub. No.: WO2014/131901
PCT Pub. Date: Sep. 4, 2014

(65) Prior Publication Data
US 2016/0010731 A1    Jan. 14, 2016

(30) Foreign Application Priority Data

Feb. 28, 2013  (NO) .................................. 20130306

(51) Int. Cl.
*F16H 25/00* (2006.01)
*F16H 25/22* (2006.01)
(Continued)

(52) U.S. Cl.
CPC ......... *F16H 25/2204* (2013.01); *F16D 28/00* (2013.01); *F16H 25/20* (2013.01);
(Continued)

(58) Field of Classification Search
CPC ...... F16H 25/2204; F16H 25/20; F16H 25/22; F16H 25/24
See application file for complete search history.

(56) References Cited

U.S. PATENT DOCUMENTS 2,409,288 A * 10/1946 Leland ................ F16H 25/2056
74/608
2,459,982 A *  1/1949 Wells ...................... B64C 25/60
244/102 R
(Continued)

FOREIGN PATENT DOCUMENTS

CN        1429320 A    7/2003
CN        1661256 A    8/2005
(Continued)

OTHER PUBLICATIONS

Norwegian Search Report dated Sep. 24, 2013 which issued in corresponding Norwegian Patent Application No. 20130306 (2 pages).

(Continued)

*Primary Examiner* — David M Fenstermacher
(74) *Attorney, Agent, or Firm* — Nixon Peabody LLP

(57) ABSTRACT

An actuator converting a rotary movement into a linear movement is disclosed. The actuator includes a drive means (11), a primary low friction screw mechanism (3, 6, 14) driven by the drive means, a secondary traditional screw mechanism (7, 13) which is connected to the primary screw mechanism and moved linearly by this. The secondary screw mechanism transfers the linear movement to a driven means, such as a clutch. The primary screw mechanism is performing the working stroke proper, while the secondary screw mechanism is arranged to compensate for changes in the engagement point of the driven means. One of the screw mechanisms is provided with a spring (4) making the actuator self-regulating.

16 Claims, 4 Drawing Sheets

(51) Int. Cl.
*F16D 28/00* (2006.01)
*F16H 25/20* (2006.01)
*F16H 25/24* (2006.01)
*F16D 23/12* (2006.01)

(52) U.S. Cl.
CPC ............ *F16H 25/22* (2013.01); *F16H 25/24* (2013.01); *F16D 2023/123* (2013.01); *F16H 2025/2059* (2013.01); *F16H 2025/2071* (2013.01)

(56) References Cited

U.S. PATENT DOCUMENTS

| | | | | |
|---|---|---|---|---|
| 2,684,132 | A * | 7/1954 | Snyder | B61H 15/0028 188/203 |
| 2,855,615 | A * | 10/1958 | Sacchini | B23G 1/16 192/41 R |
| 3,203,269 | A * | 8/1965 | Perrine | B64C 13/00 74/89.35 |
| 3,286,140 | A * | 11/1966 | Carnazza | H01F 17/04 361/294 |
| 3,766,798 | A * | 10/1973 | Kusiak | F16H 25/2015 416/153 |
| 4,105,098 | A * | 8/1978 | Klimaitis | F16F 7/1022 188/134 |
| 4,553,445 | A * | 11/1985 | Holbrook | B21D 43/021 226/141 |
| 4,799,734 | A * | 1/1989 | Periou | B60N 2/443 108/150 |
| 5,358,265 | A * | 10/1994 | Yaple | B62H 1/02 280/293 |
| 5,984,068 | A | 11/1999 | Reed, Jr. | |
| 6,050,379 | A | 4/2000 | Lyon | |
| 6,131,478 | A * | 10/2000 | Erikson | F16H 25/2006 74/441 |
| 7,681,469 | B2 * | 3/2010 | Ritter | E05F 15/622 74/89.23 |
| 7,891,265 | B2 * | 2/2011 | Erikson | F16H 25/2006 310/75 D |
| 7,938,473 | B2 * | 5/2011 | Paton | B60J 5/101 296/146.8 |
| 7,992,456 | B2 * | 8/2011 | Schroeder | F16H 25/2006 74/89.39 |
| 8,220,348 | B2 | 7/2012 | Maurel | |
| 8,226,167 | B2 * | 7/2012 | Bruck | B60N 2/233 185/37 |
| 8,967,018 | B2 * | 3/2015 | Prat Terrades | F16C 1/22 188/196 V |
| 9,016,152 | B2 * | 4/2015 | Jones | B64C 13/28 74/89.35 |
| 9,303,742 | B2 * | 4/2016 | Schroeder | F16H 25/2006 |
| 9,345,836 | B2 * | 5/2016 | Cabiri | F16H 25/2006 |
| 9,605,735 | B2 * | 3/2017 | Missler | F16H 25/20 |
| 2004/0020741 | A1 | 2/2004 | Kapaan et al. | |
| 2006/0032721 | A1 * | 2/2006 | Langwald | F16D 28/00 192/84.6 |
| 2007/0295128 | A1 * | 12/2007 | Erikson | D04B 21/04 74/89.42 |
| 2012/0074795 | A1 * | 3/2012 | Nishikawa | F16H 25/20 310/23 |
| 2015/0376929 | A1 * | 12/2015 | Scheuring | E05F 15/622 74/89.38 |

FOREIGN PATENT DOCUMENTS

| | | |
|---|---|---|
| CN | 101038023 A | 9/2007 |
| DE | 10-2007-010765 | 9/2008 |
| EP | 2503173 | 9/2012 |
| WO | 01/88402 | 11/2001 |

OTHER PUBLICATIONS

International Search Report and Written Opinion dated Jun. 2, 2014 which issued in corresponding International Patent Application No. PCT/EP2014/053995 (14 pages).

International Preliminary Report on Patentability dated Mar. 3, 2015 which issued in corresponding International Patent Application No. PCT/EP2014/053995 (14 pages).

Chinese Patent Office, Search Report in corresponding Chinese Application No. 2014800058072.2, dated May 4, 2017 (1 page).

* cited by examiner

ACTUATOR

CROSS-REFERENCE TO RELATED APPLICATIONS

This application is an U.S. national stage of PCT/EP2014/053905, filed on Feb. 28, 2014, which claims priority to Norwegian Patent Application No. 20130306, filed on Feb. 28, 2013, the contents of which are each incorporated herein by reference in its entirety.

FIELD OF THE INVENTION

The present invention relates to a linear actuator. A possible application of the actuator is as a clutch servo handling the connection between the engine and gearbox in larger vehicles such as trucks and buses, and the most powerful passenger cars. However, the invention is not limited to vehicles, but may find applications in all areas where an actuator is needed with the particular properties offered by the present invention.

BACKGROUND

In most passenger cars the clutch is handled using only muscular force. The force is transferred from the clutch pedal inside the coupe via a direct wire connection or a hydraulic connection.

More powerful vehicles are commonly equipped with an amplifying device—a clutch servo—in order to transfer the force between the pedal and clutch. A typical clutch servo consists of a pneumatic cylinder and a control valve. It has typically a stroke length of 15 mm, a force of 3-5000N and a 60 mm additional stroke length to compensate for the wear of the clutch. A pneumatic servo requires that a compressed air system is installed in the vehicle, which generally is the case for trucks and larger buses. However, small buses and large passenger cars are normally not provided with compressed air systems.

In recent years passenger cars have been equipped with dual clutch transmissions instead of conventional automatic transmissions with planetary gearing. Such transmissions include two clutches and two drive shafts. One of the clutches is connected to the series of odd gear ratios, while the other clutch is handling the even gear ratios. When shifting gear, the next gear is ready and is quickly selected with the appropriate clutch. The gear shift occurs without power loss. The clutches are operated with electrical actuators of the solenoid type.

Such transmissions are also in demand for heavier vehicles. The actuator must then be stronger as the clutch has to transfer a larger torque. A particular problem is to develop such an electrically actuated clutch that is self-regulating. In use, the clutch plate will become worn which will offset the engagement point. In a manual transmission this is not so important, as the user will compensate for this unconsciously. The clutch stroke will also be adjusted when the vehicle is serviced. Hydraulic operated clutches may otherwise be made self-regulating. The clutch arrangement in an automatic dual clutch transmission operates within narrow tolerances, and thus it is desirable that also electrical actuators are self-regulating.

SUMMARY OF THE INVENTION

It is an object of the present invention to provide a clutch actuator which may serve clutches in larger vehicles, and which is self-regulating.

This is achieved in an actuator as defined in the following claims.

In particular the invention includes an actuator for providing a linear force to a driven means. The actuator includes a drive means providing a rotating movement, a primary screw mechanism with an input which is connected to the drive means and an output, a secondary screw mechanism with an input and output, wherein the input of the secondary screw mechanism is connected with the output of the first screw mechanism, the secondary screw mechanism being linearly moved by the first screw mechanism, a spring providing a force acting on the primary or secondary screw mechanism, and means for transferring the linear movement of the secondary screw mechanism to the driven means. Unlike traditional solenoid actuators, this actuator is based on the actuating force being delivered by a rotating mechanism, which may be an electric motor. The first screw mechanism delivers the work stroke proper, while the secondary screw mechanism handles the self-regulating effect. An advantage of this design is that the actuator will adjust itself relative to the engagement point of the driven means at each work stroke.

Further, the actuator may include means preventing the output of the secondary screw mechanism from rotating. However, in some cases the driven means may itself prevent the output from rotating. Thus it is unnecessary to include these means in the actuator.

The actuator may be configured in several different ways. According to one embodiment, the primary screw mechanism includes a ball screw, a ball nut and a number of balls transferring forces between the ball screw and ball nut, and the secondary screw mechanism includes a nut and a screw which is in engagement with said nut, the secondary screw mechanism having the same direction of threads as in the primary screw mechanism. The object of this is that the primary screw mechanism should have a lower friction than the secondary screw mechanism. The secondary screw mechanism may then be executed as a traditional screw mechanism, e.g. with rectangular or trapezoidal threads.

According to another embodiment, the secondary screw mechanism includes a ball screw, a ball nut and a number of balls transferring forces between the ball screw and ball nut, the primary screw mechanism including a nut and a screw which is in engagement with said nut, the primary screw mechanism having the same direction of threads as in the secondary screw mechanism. Here the object is that the secondary screw mechanism should have a lower friction than the primary screw mechanism. Here, the primary screw mechanism may then be executed as a traditional screw mechanism, e.g. with rectangular or trapezoidal threads.

The actuator may further include a supplementary spring providing a force acting on the output of the actuator, if the driven means requires this.

The secondary screw mechanism may be provided with threads of identical or larger pitch than in the primary screw mechanism. This is a means for controlling the distribution of movement between the primary and secondary screw mechanism, similar to what is achieved by giving them different friction. The secondary screw mechanism is then made to stall when it has performed its mission, while the primary screw mechanism performs the work stroke proper.

BRIEF DESCRIPTION OF THE DRAWINGS

Additional features and advantages of the present invention will appear from the following detailed description which describes the invention with reference to the appended drawings, in which.

DETAILED DESCRIPTION

Figure 1:
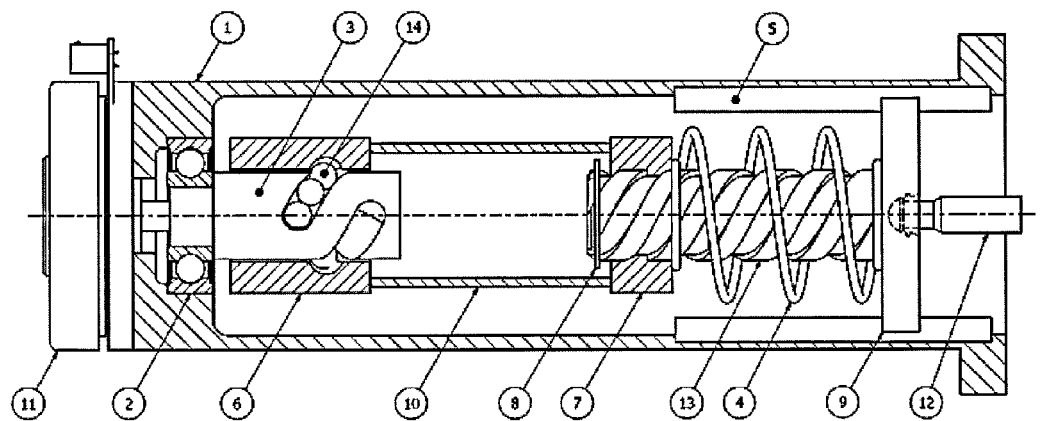
FIG. 1 is a principle sketch showing a section through a first embodiment of the invention.

The actuator shown in FIG. 1 includes a drive means 11 at the input. The rotating movement of the drive means 11 is transformed into a linear movement which is transferred to a driven means (not shown) by the pushrod 12. The rotating movement is transferred to two serially-connected screw mechanisms, a primary screw mechanism providing the working stroke, and a secondary screw mechanism compensating changes in the engagement point of the driven means.

The drive means may be an electric motor. However, other drive means may be considered, such as pneumatic or hydraulic motors, or that the actuator is operated manually.

The primary screw mechanism includes a ball screw 3 which is connected with the drive means 11, and a ball nut 6. Spiral-shaped tracks are milled into both the ball screw and ball nut, a number of balls 14 running in the tracks transferring forces and torque between the ball screw and ball nut. When the drive means 11 rotates the ball screw 3, the ball nut 6 will be moved back and forth, dependent on the turning direction of the drive means. A ball race 2 is shown mounted between the motor and primary screw mechanism, but any type of bearing suited for the purpose may be used in this location, such as a slide bearing or roller bearing.

This linear movement is transferred to the secondary screw mechanism by the distance tube 10. The secondary screw mechanism includes a nut 7 which is connected to the other end of the distance tube 10. The nut 7 is in engagement with a central screw 13. In the illustration, the screw 13 is provided with a Seeger ring 8 at the end thereof. The nut 7 and screw 13 are preferably provided with rectangular threads or trapezoidal threads, even though other threads may also be used. The nut/screw will be pushed in/out of the ball and, to prevent the output part of the secondary screw mechanism from rotating, the screw 13 is mounted to a guiding plate 9 which is in engagement with and slides along two wedges 5. This rotation-preventing mechanism may also be arranged outside the actuator itself, and may e.g. be handled by the equipment driven by the actuator. All this is encapsulated by a housing 1.

One of the screw mechanisms must be equipped with a spring providing the self-regulating effect.

When the spring is connected between the screw and nut in the secondary screw mechanism, the spring will have two functions:
1) It will push the primary screw mechanism back to the start position when the applied torque ceases.
2) It will provide a positive force from the actuator when the actuator is in idle mode.

For applications wherein it is not desired with a force out of the actuator when idle, the spring must be mounted on the primary screw mechanism. The spring will then only act to push the primary screw mechanism back to the start position when the applied moment ceases.

In the embodiment of the invention shown in FIG. 1, the secondary screw mechanism is provided with a spring 4. The spring force will typically represent some few percent of the working strength, i.e. the force provided when the push rod is driven back and forth. The function of the spring is to expand the secondary screw mechanism if the actuator is configured as a pushing actuator. If the actuator is configured as a pulling actuator, the function of the spring is to collapse the secondary screw mechanism.

Figure 2:
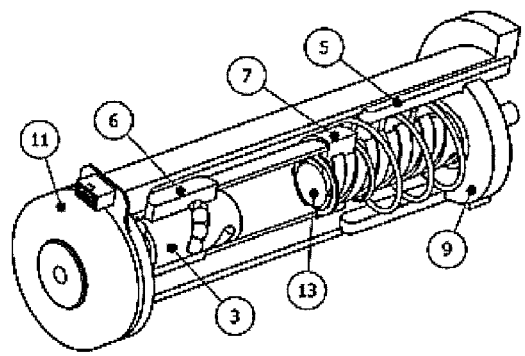
FIG. 2 is a perspective sketch of the same embodiment.
Figure 3:
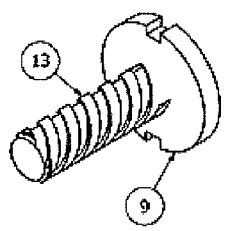
FIG. 3 shows a detail of this embodiment.

FIG. 2 is a perspective view of the clutch actuator, while FIG. 3 illustrates how the secondary screw 13 is fixed to the guiding plate 9 and forms one unit.

The primary screw mechanism and secondary screw mechanism will both turn in the same direction (both being right-hand threaded or both being left-hand threaded), but the secondary screw mechanism should be threaded a bit steeper than the primary screw mechanism, amongst others to compensate for the spring force. The secondary screw mechanism must also be sufficiently steeply threaded to avoid being self-locking.

The primary screw mechanism should have low friction, and may include a ball screw/nut mechanism as illustrated. The secondary screw mechanism should have a little more friction, and may be realized as a traditional screw/nut connection (e.g. with rectangular threads or trapezoidal threads). This means that the secondary screw mechanism should provide a little more friction against the movements than the primary screw mechanism.

When "idle", the spring will push the primary screw mechanism back (making it ready for use), and it will push on the rod providing a positive force on the thrust bearing in a possible clutch. When the actuator is used to serve a clutch, it will naturally be configured as a pushing actuator, i.e. that the spring must push back against the primary screw mechanism.

The spring 4 must be dimensioned to give the actuator its self-regulating effect. If the force from this spring does not match the force required from the actuator when idle, the actuator may be provided with a supplementary spring 15 acting on the output from the actuator.

When the clutch is to be disengaged, the motor is activated. The motor provides a torque on the ball screw which will rotate and push out the ball nut while the secondary screw mechanism will remain stationary. The movement of the ball nut will be transferred via the distance tube to the secondary screw mechanism and finally push out the push rod. The primary screw mechanism will rotate because of the lower friction (and thus better efficiency).

Compensation for wear: In "old times" when the pedal was connected to the clutch with a wire, the pedal would be gradually shifted outwards when the clutch became worn. In this case, the engagement point will be shifted in a similar way. In the inventive actuator the secondary screw mechanism will be pushed back and thus absorb this shift. To allow this, the nut of the secondary mechanism and the complete primary screw mechanism must rotate.

Figure 4:
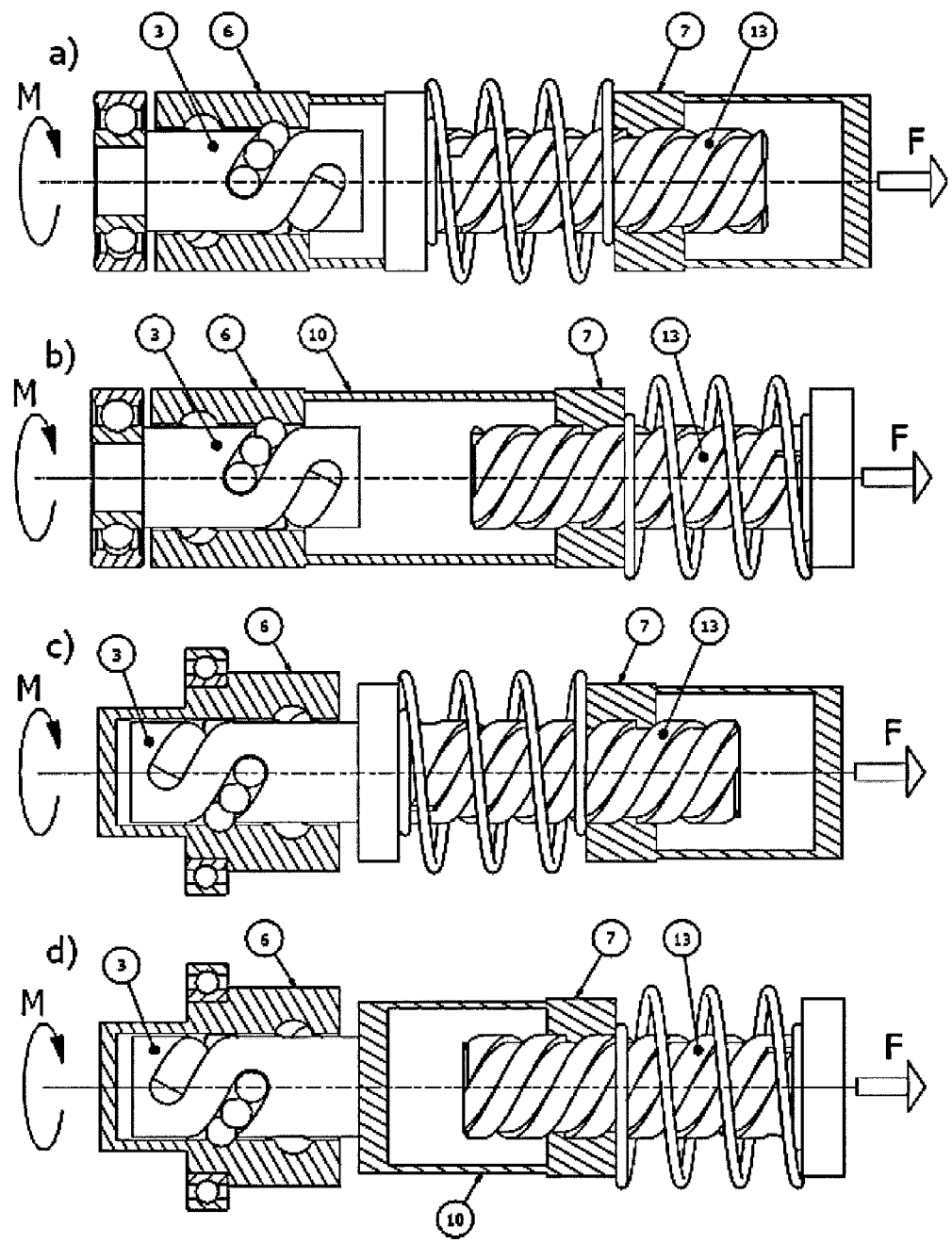
FIG. 4a-d show four possible configurations of the invention.

Several combinations of screws and nuts are possible in the first and second screw mechanism. In FIG. 4a it is shown an embodiment wherein the input (from the motor) is connected to the ball screw 3, the ball nut 6 is connected to the secondary screw 13, while the output is taken from the secondary nut 5. FIG. 4b shows an embodiment wherein the input is connected to the ball screw 3, the ball nut 6 is connected to the secondary nut 5, while the output is from the secondary screw 13. FIG. 4c shows an embodiment wherein the input is connected to the ball nut 6, the ball screw 3 is connected to the secondary screw 13, while the output is from the secondary nut 5. Lastly FIG. 4d shows an embodiment wherein the input is connected to the ball nut 6, the ball screw 3 is connected to the secondary nut 5, while the output is from the secondary screw 13. It is also possible to swap input and output, thus making four additional possible configurations of the actuator available. One could rather say that that the motor 11 is connected to an input of the first screw mechanism, that the output of the first screw mechanism is connected to an input of the second screw mechanism, and that the output of the second screw mechanism is connected to the push rod 12 for transferring a linear movement to the clutch. In such a way all possible combinations may be used in the screw mechanisms. Note that in FIG. 4 no mechanism for preventing rotation of the output is shown.

Figure 5:
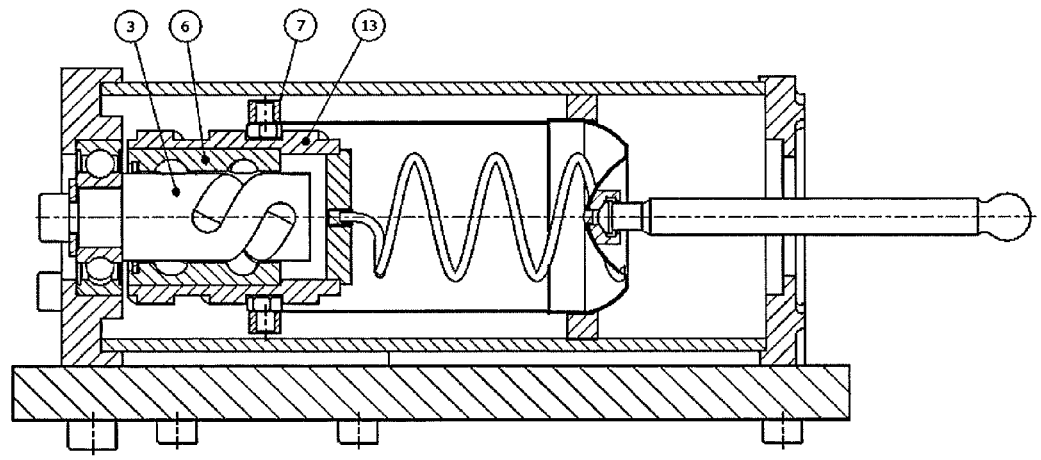
FIGS. 5-7 show other embodiments of the invention.

FIG. 5 illustrates another embodiment of the invention. To conserve space, the primary screw mechanism is placed inside the secondary screw mechanism. The secondary screw 13 is designed as a hollow cylinder mounted externally on the primary ball nut 6. The secondary nut is designed as an elongated cylinder or cup 7 with threads 14 engaging the threads of the screw. The cylinder- or cup-shaped nut is guided by a guiding plate 9. It is otherwise possible to design the clutch actuator with the secondary screw mechanism located inside the primary screw mechanism, i.e. the other way around from that shown in FIG. 4. More configurations are also possible according to the schematic illustration in FIG. 4.

Figure 6:
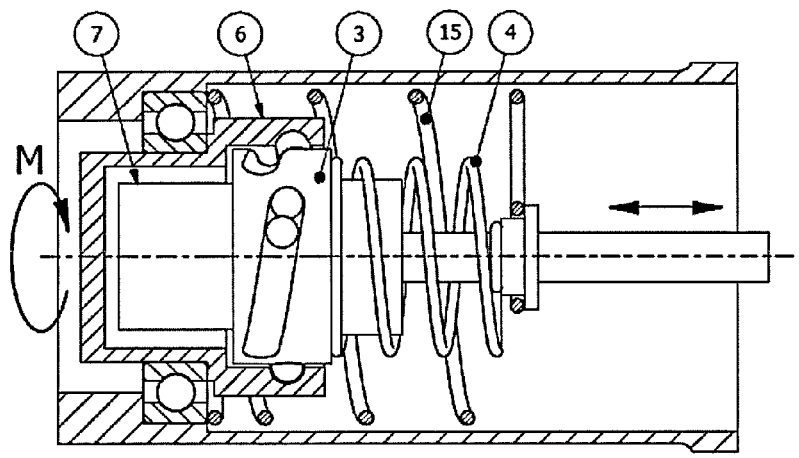
Figure 7:
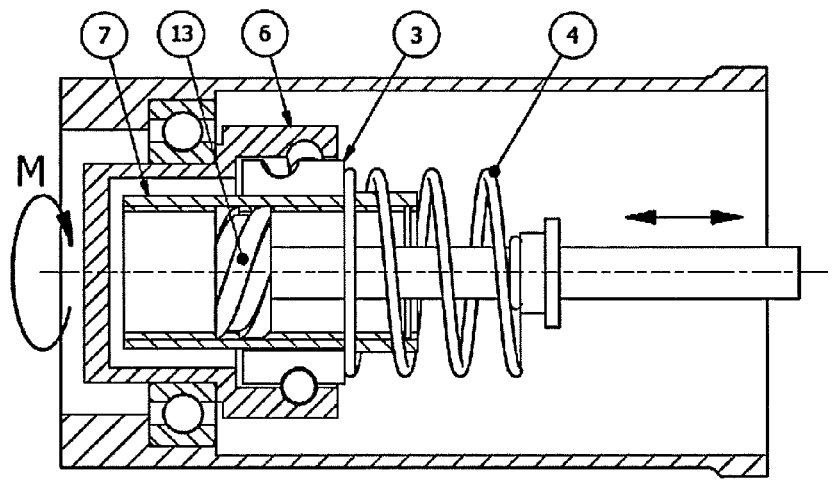

FIGS. 6 and 7 show two additional embodiments of the invention. These embodiments have identical functions to the previous embodiments, but have a more compact form as the primary and secondary screw mechanisms are nested. The embodiment in FIG. 6 is provided with a supplementary spring 15 providing an additional force onto the driven means, as explained above.

Figure 8:
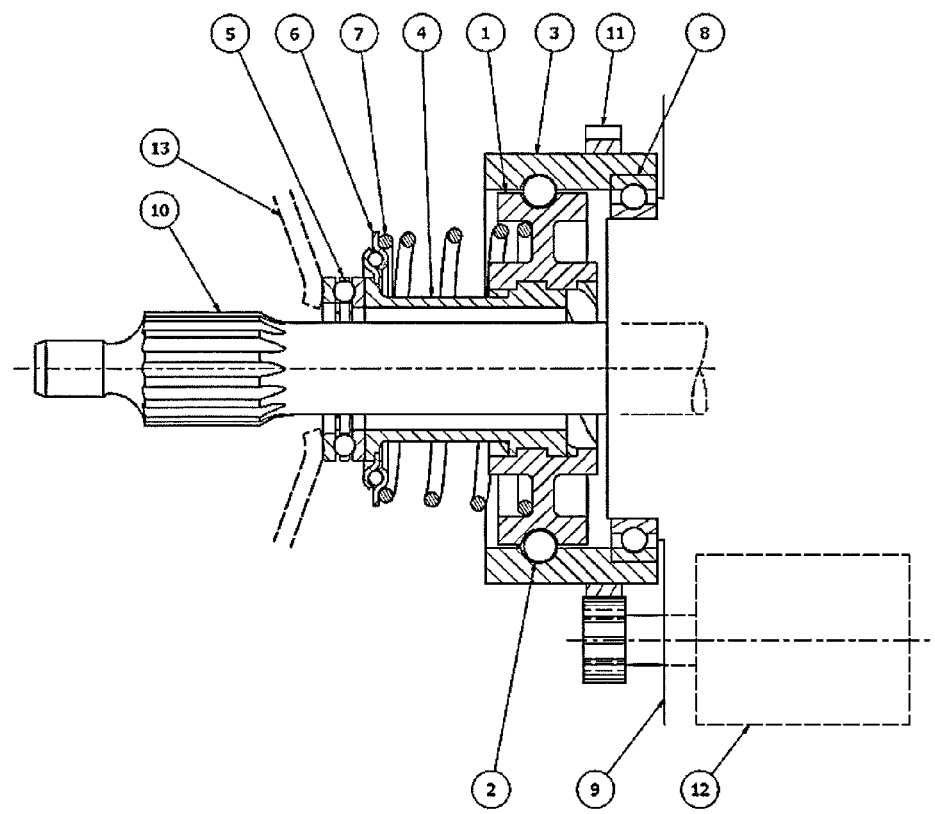
FIG. 8 shows an implementation of the invention in the transmission of a vehicle.

FIG. 8 shows the inventive actuator installed in a vehicle, i.e. in the bell housing between engine and gear box 17. The figure shows the transmission shaft 18 transferring rotary forces to the gear box, the transmission shaft including an end tap for engaging the pin bearing in the centre of the flywheel and a spline section upon which the clutch plate is sliding. The actuator is engaged by means of the motor 11. The rotary motion from the motor 11 is transferred to the ball nut 6 through a ring gear 20. The ball screw of the primary screw mechanism and the nut of the secondary screw mechanism have been combined into one screw element 21 converting the rotary motion of the ball nut 6 into a linear motion of the central screw 13. The central screw is hollow and is mounted coaxial with and surrounding the transmission shaft 18. The motion of the central screw is transferred to the clutch bearing 15, the clutch spring 19 and further onto the clutch plate (not shown). An additional bearing 16 has been introduced between the spring 4 and the central screw 13 in order to reduce friction.

As mentioned earlier, this actuator has several applications other than to serve the clutch of a lorry. Several applications may be considered where a self-regulating actuator is needed to compensate for wear or changing requirements on the driven device. However, this actuator possesses other properties which may make it interesting in several fields.

In particular the actuator may be considered used in parallel with other mechanisms/functions, or as backup. One example may be in an electrical door opener.

In many buildings, doors are provided with electrical door openers for wheelchair users. The door opener is activated with an electrical switch, while it simultaneously may be operated manually. When someone tries to open the door manually, this is registered by the mechanism which activated the door opener. However, the person who tries to open the door will experience an increasing resistance until the door opener is activated. The door is then opened electrically. This takes some time and the person has to wait some seconds. Functional healthy persons find this cumbersome. Used as a door opener, the present actuator will allow the door to be opened and closed manually. It will raise minimal resistance against manual operation.

For other actuators, a part of the strike may form a "transport stage" with little or no resistance. An example may be in a log splitter.

Log splitters often have a long strike, about 70 cm, in order to split long logs. However, the splitter is often used to split rather short logs of 30-40 cm. At each stroke the user has to wait while the knife is moving "idle" until it reaches the log. There are solutions handling this, i.e. shorten the idle time for the user, but this actuator may also serve such a function. The actuator is then used between the drive motor and knife. With this actuator the "idle stage" will be provided by the secondary screw mechanism due to the spring 4. With increasing resistance, the secondary screw mechanism will stop (due to friction and larger thread pitch) and the primary screw mechanism takes over. Due to the larger pitch in the secondary screw mechanism, the "idle stage" will go faster.

The invention claimed is:

1. An actuator for providing a linear force to a driven means,
  characterized in that it includes:
  a drive means (11) providing a rotating movement,
  a primary screw mechanism (3, 6, 14) with an input which is connected to the drive means (11) and an output,
  a secondary screw mechanism (7, 13) with an input and output, wherein the input of the secondary screw mechanism is connected with the output of the first screw mechanism, the secondary screw mechanism being linearly moved by the first screw mechanism,
  a spring (4) providing a force acting on the primary or secondary screw mechanism, and
  means (12, 13) for transferring the linear movement of the secondary screw mechanism to the driven means.

2. An actuator according to claim 1, further including means (9, 5) preventing the output of the secondary screw mechanism from rotating.

3. An actuator according to claim 1, wherein the primary screw mechanism includes a ball screw (3), a ball nut (6) and a number of balls (14) transferring forces between the ball screw and ball nut,
  the secondary screw mechanism including a nut (7) and a screw (13) which is in engagement with said nut, the secondary screw mechanism having the same direction of threads as in the primary screw mechanism.

4. An actuator according to claim 3, wherein the secondary screw mechanism is designed with rectangular or trapezoidal threads.

5. An actuator according to claim 1, wherein the secondary screw mechanism includes a ball screw (3), a ball nut (6) and a number of balls (14) transferring forces between the ball screw and ball nut,
  the primary screw mechanism including a nut (7) and a screw (13) which is in engagement with said nut, the primary screw mechanism having the same direction of threads as in the secondary screw mechanism.

6. An actuator according to claim 5, wherein the primary screw mechanism is designed with rectangular or trapezoidal threads.

7. An actuator according to claim 1, further including a supplementary spring (15) providing a force acting on the output of the actuator.

8. An actuator according to claim 1, wherein the secondary screw mechanism is provided with threads of identical or larger pitch than in the primary screw mechanism.

9. An actuator according to claim 1, wherein the driven means comprises a clutch.

10. An actuator according to claim 2, wherein the driven means comprises a clutch.

11. An actuator according to claim 3, wherein the driven means comprises a clutch.

12. An actuator according to claim 4, wherein the driven means comprises a clutch.

13. An actuator according to claim 5, wherein the driven means comprises a clutch.

14. An actuator according to claim 6, wherein the driven means comprises a clutch.

15. An actuator according to claim 7, wherein the driven means comprises a clutch.

16. An actuator according to claim 8, wherein the driven means comprises a clutch.

* * * * *